(No Model.)
C. W. McLEAN.
GLASS MANTLE.
No. 253,542. Patented Feb. 14, 1882.
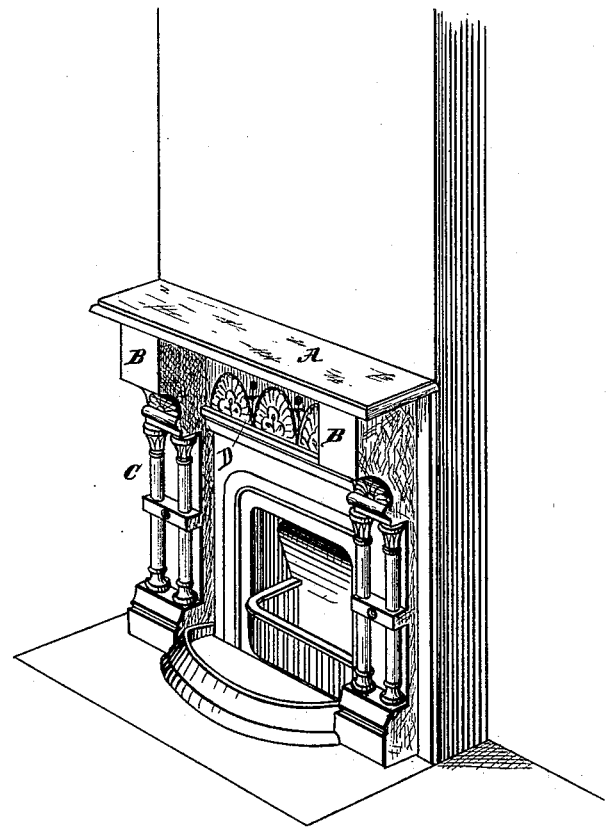
Witnesses
F. B. Townsend
W. C. Adams
Inventor
Christopher W. McLean
per M. E. Dayton
Attorney

UNITED STATES PATENT OFFICE.

CHRISTOPHER W. McLEAN, OF NEW BERNE, NORTH CAROLINA.

GLASS MANTEL.

SPECIFICATION forming part of Letters Patent No. 253,542, dated February 14, 1882.

Application filed June 4, 1881. (No model.)

*To all whom it may concern:*

Be it known that I, CHRISTOPHER W. MCLEAN, of New Berne, in the State of North Carolina, have invented certain new and useful Improvements in Glass Mantels; and I do hereby declare that the following is a full, clear, and exact description thereof, reference being had to the accompanying drawing, and to the letters of reference marked thereon, which form a part of this specification.

This invention consists in a mantel made of glass.

In the drawing, which may represent a mantel containing my invention, A is the mantel-top, B B are brackets, C C are columns, and D is the vertical face of the mantel. These parts, or such of them as may be present, are in my invention constructed of glass molded in form. Said parts may, if desired, be molded in a single piece; but preferably they will be separate and joined in the finished structure by cement, dowels, ties, or other available means. The glass may preferably be colored while melted to give in the finished mantel the appearance of marble, malachite, or other quality of stone, or the appearance of any other preferred material; but it may be also subsequently colored or decorated by staining, painting, and burning, or otherwise, or it may retain the appearance of glass. The cost of a mantel of glass will in the first instance be greatly less than that of marble, which requires to be cut to form at much expense, and it will also more permanently retain its color and surface, because of its different structural character and of its resistance to the action of acids and other substances by which marble is readily defaced or discolored.

In mantels of glass the surfaces may be left as they leave the mold, or they may be polished, cut, or in other manner finished to suit the taste.

In a mantel molded of glass, as described, fancy tiles may be secured in the face D or elsewhere by arranging such tiles in the mold before pouring the glass therein.

A top of marble or other material employed in connection with lower parts of glass will not be a departure from my invention.

I am aware it is not new to construct mantels of plates of glass set into frames, and such I do not claim.

I claim as my invention—

A mantel composed entirely of glass molded to form, either as a whole or in parts, substantially as described.

In testimony that I claim the foregoing as my invention I affix my signature in presence of two witnesses.

CHRISTOPHER W. McLEAN.

Witnesses:
J. M. HAFLEIGH,
JOHN C. GRANGER.